United States Patent [19]

Kloefkorn et al.

[11] 3,967,719

[45] July 6, 1976

[54] COMBINE CONVEYOR MEANS

[76] Inventors: Earl W. Kloefkorn; Melvin L. Kloefkorn, both of Manchester, Okla. 73758

[22] Filed: Jan. 4, 1973

[21] Appl. No.: 320,999

[52] U.S. Cl. ............................... 198/175; 56/14.6; 130/27 R
[51] Int. Cl.² ..................................... B65G 19/00
[58] Field of Search ................. 56/14.6, 14.5, 123, 56/124; 130/27 R, 27 AB; 198/174, 160, 175, 198, 199

[56] References Cited
UNITED STATES PATENTS

| | | | |
|---|---|---|---|
| 758,739 | 5/1904 | Culp | 198/174 X |
| 1,680,888 | 8/1928 | Kluck | 198/174 |
| 2,332,025 | 10/1943 | Stone et al. | 56/124 |
| 2,369,745 | 2/1945 | Millard et al. | 56/14.6 |
| 2,400,502 | 5/1946 | Hapman | 198/174 |
| 2,652,677 | 9/1953 | Krause et al. | 130/27 R |
| 2,758,702 | 8/1956 | Smoker | 198/175 |
| 3,316,978 | 5/1967 | Hines | 198/198 |
| 3,669,124 | 6/1972 | DeCoene | 130/27 R |

Primary Examiner—Russell R. Kinsey

[57] ABSTRACT

This invention comprises novel combine conveyor means having novel transverse slat or flight means adapted to engage and drag fresh cut unthreshed grain along at a uniform velocity and then eject the same at an increased velocity at an exit end of the conveyor means while the velocity of the conveyor means remains the same, and the transverse slat means being formed with recesses in grain engaging edge portion means thereof or formed with a plurality of trailing fingers for providing a stripping action on the grain as the grain is transferred from an auger to a conveyor and from the conveyor to a threshing cylinder.

7 Claims, 22 Drawing Figures

COMBINE CONVEYOR MEANS

BACKGROUND OF THE INVENTION

This invention relates to combines for harvesting grain. More particularly, this invention relates to conveyors for a feeder house of a combine.

Heretofore, combines have been rendered useless and fields of grain have gone unharvested due to a failure of a conveyor in a feeder house of a combine to adequately convey fresh cut unthreshed grain from a cutter bar and auger of a platform up into a threshing cylinder of the combine. It is a desideratum in the art of combine feeder house conveyors that the fresh cut unthreshed grain be taken from the auger on the platform and delivered to the threshing cylinder as the grain is being cut by the cutter bar. A failure of the conveyor to adequately perform this function will operate to slow or stop the operation of the combine altogether. Moreover, transverse slat means carried by a conveyor belt or chain have performed the function of taking the grain from the auger and dragging the grain along a feeder house bottom pan to the threshing cylinder in the combine. More succinctly, the slat means of this invention strips the grain from the auger by the aforementioned fingers and finger action and then literally hands the grain up into the threshing cylinder from the conveyor means by an underhanded scooping or pitching action of the fingers of the slats. Any failure or impairment of the conveyor in the feeder house to adequately perform this function results in a failure or slowing of the entire threshing operation. Particular difficulty has been encountered in the failure of the conveyor to properly transfer the grain to the cylinder with a resulting pileup and backup of the grain in front of the cylinder and a feedback of the grain over the top of the conveyor back to the auger. Additionally, the desired stripping of the grain from the auger onto the conveyor and the scooping or pitching of the grain into the threshing cylinder has not been satisfactorily obtainable with prior art slat configurations and this disadvantage lends itself to further dissatisfaction with the prior art conveyors that utilize slats.

SUMMARY OF THE INVENTION

It is therefore an object of this invention to provide novel combine conveyor means having novel transverse slat means for use in a feeder house of a combine for harvesting grain.

Another object of this invention is the provision of novel combine conveyor means for use in a feeder house of a combine wherein means are provided for reaching out and raking in through a stripping action fresh cut unthreshed grain from an auger on a platform mounting a cutter bar thereon and conveying the grain along a feeder house bottom pan.

A further object of this invention is the provision of novel combine conveyor means for use in a feeder house of a combine and having means for conveying fresh cut unthreshed grain along a feeder house bottom pan and then stripping, scooping, pitching, impelling, and/or ejecting the grain in the direction of and/or against a threshing cylinder of the combine.

Yet another object of this invention is the provision of novel combine conveyor slat means adapted to be connected to chain means.

A still further object of this invention is the provision of novel combine conveyor slat means adapted to be connected to conveyor chain means, the slat means having hand and/or finger means adapted to engage, strip, and/or grab fresh cut grain at one end of the conveyor means and to eject, scoop, pitch, and/or impel the grain at an exit end of the conveyor means at an accelerated velocity in the direction of and/or against a threshing cylinder of the combine.

Another object of this invention is the provision of novel combine conveyor slat means adapted to be connected to combine conveyor chain means, the slat means having an inverted U-shaped cross-sectional configuration with finger means and/or flange-like hand means connected to and extending rearwardly from said slat means to engage fresh cut unthreshed grain in a feeder housing of a combine.

A still further object of this invention is the provision of novel slat means as set forth in the preceding paragraph and wherein said finger means are of rectangular, square, and/or circular cross-sectional configuration.

Another object of this invention is the provision of novel slat means having an inverted U-shaped cross-sectional configuration with flange means connected to a trailing edge or leg portion thereof, said flange means being disposed at an angle of 0° to 60° to a plane defined by a path of travel of said slat means.

A further object of this invention is the provision of novel slat means having an inverted L-shaped cross-sectional configuration with flange means and/or finger means extending rearwardly therefrom, said flange means and/or said finger means being disposed at an angle of 0° to about 45° to a plane defined by a path of travel of said slat means.

Another object of this invention is the provision of novel slat means having one or more downwardly and/or rearwardly extending portions formed with notched, serrated, scalloped, pinked, and/or recessed lower edge portions adapted to engage and convey fresh cut unthreshed grain in a feeder house of a combine.

A still further object of this invention is the provision of novel slat means having one or more downwardly and/or rearwardly extending portions formed with broad surface areas adapted to engage fresh cut unthreshed grain and not sever or cut the grain or deform itself under heavy load for uniform conveyor action.

This invention comprises conveyor means for use in a feeder house of a combine for harvesting grain. The feeder house connects a threshing cylinder of the combine with a platform mounting a cutter bar and an auger thereon along with a reel. The platform forms the reaper portion of the combination with a threshing machine portion, referred to herein as a combine. The platform can be raised and lowered depending upon the terrain and the height of the heads of the grain to be combined above the ground. The lower entrance end of the conveyor is usually spring-loaded to accommodate an adjustment of about four inches depending upon the quantity of fresh cut unthreshed grain to be ingested into the feeder house between the conveyor and a bottom pan of the feeder house and conveyed to the threshing cylinder of the combine. The entrance end of the conveyor comprises preferably two or more sprocket wheel idler means on a transverse shaft. The exit end of the conveyor comprises preferably two or more sprocket wheel drive means on a drive shaft driven by a power transmission system from an internal combustion engine, such as a gasoline engine. Parallel sprocket chains are disposed over the sprocket drive and idler wheels. Elongated transverse slats are disposed on and connected to the parallel sprocket chains. One transverse slat may be connected to the links of the sprocket chains as desired.

The transverse slat means embodying this invention may comprise every one, second or third of the slats used on the conveyor as desired by the user. However, each of the slats of this invention comprises rearwardly extending means preferably having notched, serrated, scalloped, pinked, and/or recessed portions formed in a lowermost grain engaging edge portion thereof with the sprocket drive wheel preferably of relatively small diameter to scoop, pitch, eject, and/or impel the grain from the feeder house in the direction of and/or against the threshing cylinder to facilitate the transfer of the conveyed grain into the cylinder chamber. This force action to scoop, pitch, eject, and/or impel the grain amounts to an acceleration of the resulting increased velocity of the grain at the exit end of the conveyor over the relatively uniform but slower velocity of the sprocket chain. Accordingly, the conveyor slat of this invention provides accelerating force action to the grain as well as the stripping action thereto as referred to hereinabove. However, grain engaging portions of the slat embodying the invention are preferably flat so as to provide broad surface areas that resist the cutting, severing, and/or shearing of the grain. Moreover, the slats do not bend under stress to impair the conveying action thereof.

A preferred configuration of a slat embodying this invention comprises a slat body of generally inverted U-shaped cross-sectional configuration, and rearwardly extending means connected to a trailing leg of the slat body adapted to be connected to the sprocket chains that may be laterally spaced from each other by perhaps twelve inches to several feet, depending upon the harvesting capacity of the combine. The slats are connected to the sprocket chains transversely thereof parallel to the sprocket wheel shafts. The rearwardly extending means may comprise a transverse flange connected to the lowermost trailing edge portion of the slat body perpendicular thereto or depending downwardly and rearwardly to an angle of about 45° to a path of travel of the slat or sprocket chains. The flange may be replaced with finger-shaped means that extend rearwardly having a cross-sectional configuration that is perpendicular, square, or round. Preferably the grain engaging edge portions of the slat body and/or rearwardly extending means, such as the flange, are serrated, notched, scalloped, pinked, and/or recessed to provide the desired feeding or conveying action on the grain in the feeder housing.

Other preferred embodiments of the invention comprises slats having an inverted L-shaped cross-sectional configuration forming the slat body means with a rearwardly and downwardly extending grain engaging flange that operates as a grain kicker to accelerate the flow of grain at the exit end of the conveyor in the direction of and/or against the threshing cylinder. Preferably, the flange extends downwardly at an angle of from 0° to preferably 45° to a plane defined by a path of the sprocket chains. The angle of the leading edge leg of the slat body is approximately 90° between the two legs of the L-shaped body, more or less. In this embodiment, the drawing shows this angle to be slightly greater than 90°.

As an alternative to the use of a rearwardly extending flange with the inverted L-shaped slat body means, trailing fingers are connected to the slat body means at the underside of the top leg and/or the backside of the other leg of the slat body means.

A still further embodiment of the novel slat means of this invention is the provision of slat body means having an inverted L-shaped cross-sectional configuration in which a downwardly extending leg is connected to a trailing edge of the upper leg in lieu of at the leading edge of the upper leg as in the embodiments in the two preceding paragraphs. A rearwardly extending kicker flange is connected at right angles to the downwardly extending leg at a lower edge portion thereof. An upwardly extending grain deflector flange is connected perpendicularly to a leading edge of the upper leg of the slat body means so that the entire slat has a stepped cross-sectional configuration like a stair.

The invention further resides in certain novel features of construction, combinations and arrangements of parts, and further objects and advantages of the invention will be apparent to those skilled in the art to which it pertains from the following description of the present preferred embodiments thereof described with reference to the accompanying drawings, which form a part of this specification, and wherein the same reference characters represent corresponding parts throughout the several views, and in which:

It is to be understood that the invention is not limited to the details of construction and arrangements of parts shown in the drawings and hereinafter described in detail, but is capable of being otherwise embodied and of being practiced or carried out in various ways. It is to be further understood that the phraseology or terminology employed herein is for the purpose of description and there is no intention to herein limit the invention beyond the requirements of the prior art.

Referring to FIGS. 1 through 5, a farm combine for reaping and threshing in situ organic agricultural vegetable food materials, such as harvestable grain, is indicated generally by reference numeral 26. The combine 26 rides on a pair of wheels 23 on the ground 24 in a field of harvestable grain and has a vertically adjustable platform 25 carrying a reel 27, a cutter bar 28, and an auger 29. The reel 27 sweeps harvestable, threshable, uncut small grain, such as wheat, oats, barley, rye, corn, etc., not shown, into the cutter bar 28. The felled grain is fed into the auger 29. Conveyor means embodying the invention and indicated generally by the reference numeral 30, is disposed in a feeder house 31.

Figure 1:
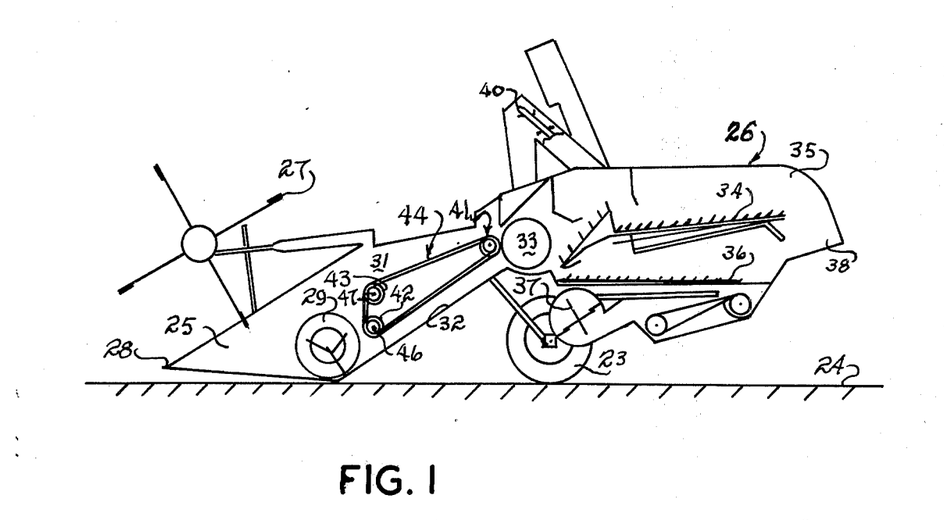
FIG. 1 is an elevational cross-sectional view along a longitudinal axis of a combine embodying the invention.

The conveyor means 30 operates to compress the fresh cut unthreshed grain against a bottom pan 32 of the feeder house 31 and drags the grain up to a threshing cylinder 33 of the combine 26. The cylinder 33 threshes the grain and feeds the same onto shaker pan and screening means 34 in a rear housing portion 35 of the combine 26. The grain and/or kernel of the grain is shaken and screened onto a second shaker pan and screening means 36. Air is blown upwardly through the pan and screening means 36 from a blower 37 to exhaust the chaff and other debris to the atmosphere via a rear exit duct 38 of the combine 26. The harvested particulate small grain is then conveyed by a grain conveyor 40 for transfer to a grain bin, not shown.

The conveyor 30 comprises rear sprocket drive wheel means indicated generally by reference numeral 41, lower front sprocket idler wheel means 42, and upper front sprocket idler wheel means 43 having parallel sprocket chain means indicated generally by reference numeral 44 disposed over and carried thereby. The rear sprocket drive wheel means 41 comprise sprocket wheels keyed to a drive shaft 45 driven by an internal combustion engine power source through power transmission means, not shown. Similarly, the lower and upper front sprocket idler wheel means 42 and 43 are respectively journaled in pairs on shafts 46 and 47, FIG. 1. The shafts 45, 46, and 47 carry a pair of parallel sprocket chains that comprise the sprocket chain means 44. A plurality of identical transverse slat means indicated generally by the reference numeral 50 are connected to oppositely disposed links of the sprocket chain means 44, FIGS. 2, 3, 4, and 5. It will be understood that although there are only two sprocket wheels on each shaft, that there may be three or more sprocket wheels on each shaft as desired by the user. Only two sprocket wheels on each shaft is used herein for purposes of simplicity. The additional sprocket chain on the third sprocket wheels would operate to reinforce the slats against bending and separation from the sprocket chains.

It will be understood that the front end of the conveyor means 30 adjacent the auger 29 may be elevated or raised as much as four inches or more preferably against the tension of spring means, not shown, to accommodate the ingestion of variable quantities of fresh cut unthreshed grain depending upon such variables as speed of the combine 26, the length and size of the stalks and/or stems of the grain being reaped, and/or the moisture in or the density of the grain in the field being harvested.

The slat means 50 each comprises a transversely extending body portion 51 of rectangular cross-section and longitudinal configuration that provides the reason for calling the same a slat. The body portion 51 on the lower run forms an upper inclined leg. The slat means 50 further comprises a downwardly extending vertical leg or flange portion 52 at a leading edge portion of the body portion 51. The legs 51 and 52 have an inverted L-shaped cross-sectional configuration, and may be referred to as an angle member. A similarly shaped angle member comprises a depending leg 53 having an inclined leg 54 connected to a lower edge portion thereof. However, the angle formed therebetween the legs 53 and 54 is approximately 90°, and more particularly, the angle shown in FIGS. 1 through 5 is slightly greater than 90°. The upper edge portion of the leg 53 is connected to a rear trailing edge portion of the body portion of the leg 51. The downwardly depending legs 52 and 53 are connected to the leading and trailing edges respectively of the leg 51 at right angles thereto to form an inverted U-shaped cross-sectional configuration. The leg 54 comprises a rearwardly extending flange that operates as a grain ejector, stripper, impeller, kicker, scooper, pitcher, and/or accelerator at the exit end of the conveyor means 30 to propel the fresh cut unthreshed grain off of the feeder house bottom pan 31 in the direction of and/or against the threshing cylinder 33. Moreover, the rearwardly extending flange or leg 54 operates as a hand at the entrance end of the conveyor means 30 adjacent the auger 29 for grabbing or stripping and dragging the grain from the auger 29 into the feeder house 31 between the conveyor means 30 and the feeder house bottom pan 32.

Figure 2:
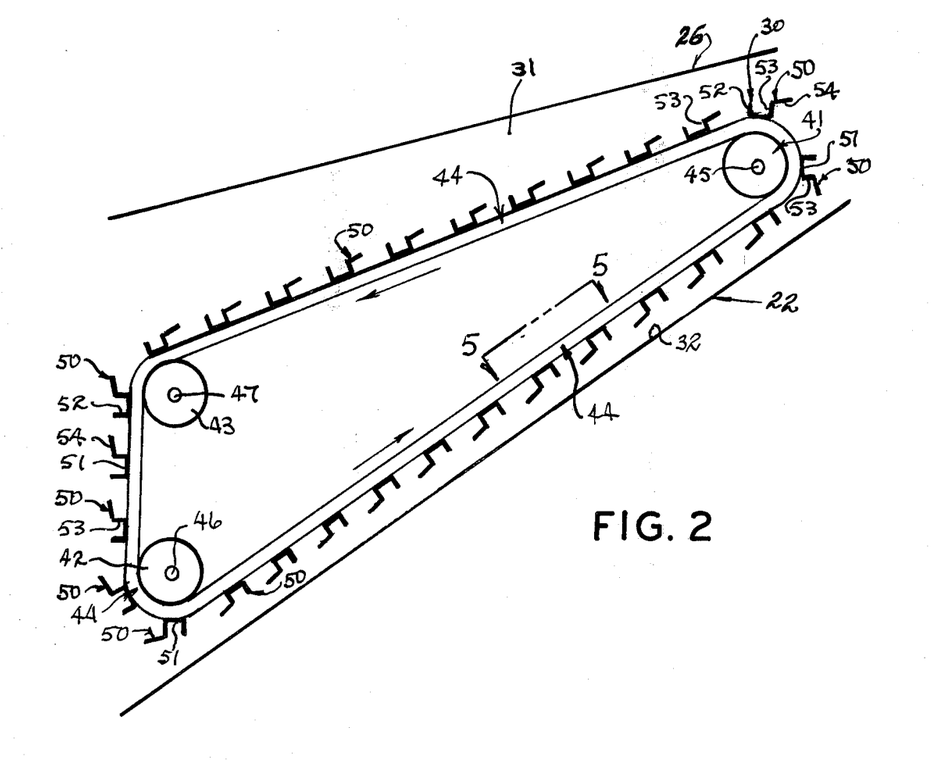
FIG. 2 is an enlarged view of a conveyor of a feeder housing embodying the invention in the combine of FIG. 1.
Figure 3:
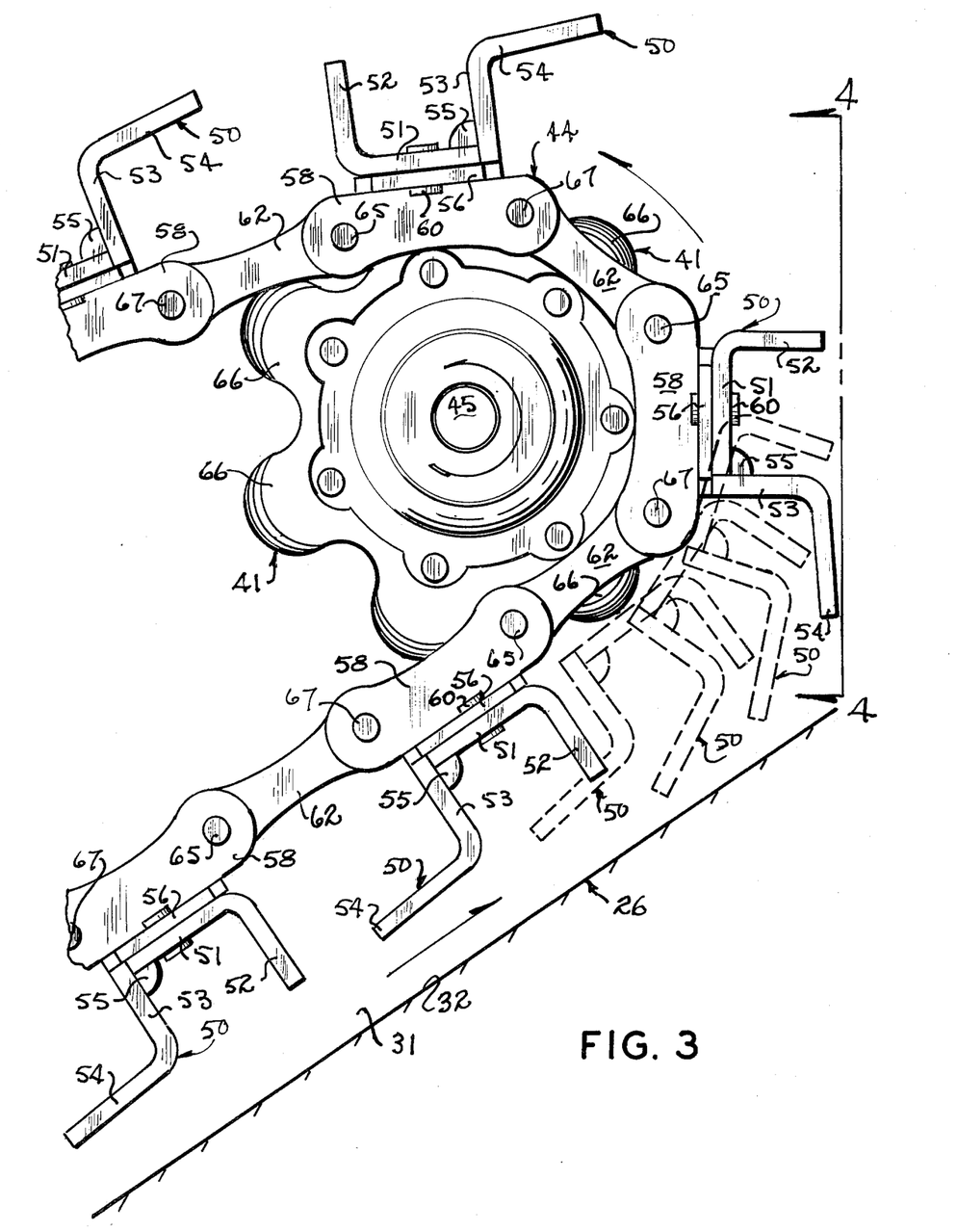
FIG. 3 is a further enlarged view of a rear sprocket drive wheel portion of the conveyor of FIGS. 1 and 2 with slat portions in hidden outline to illustrate an ejection, stripping, expelling, scooping, pitching, and/or kicker action of the slats of this invention.

As best seen in FIGS. 2 and 3, on the lower run the flange or leg 54 is inclined downwardly at an angle of preferably approximately eight degrees with a plane defined by a path of travel of the slat means 50. All of the legs 51, 52, 53, and 54 are of the same transverse length preferably. The legs 53 and 54 are preferably integrally connected together and the legs 51 and 52 are preferably integrally connected together. The legs 51 and 53 are preferably connected together by a welding bead 55, FIG. 3.

Figures 4, 5:
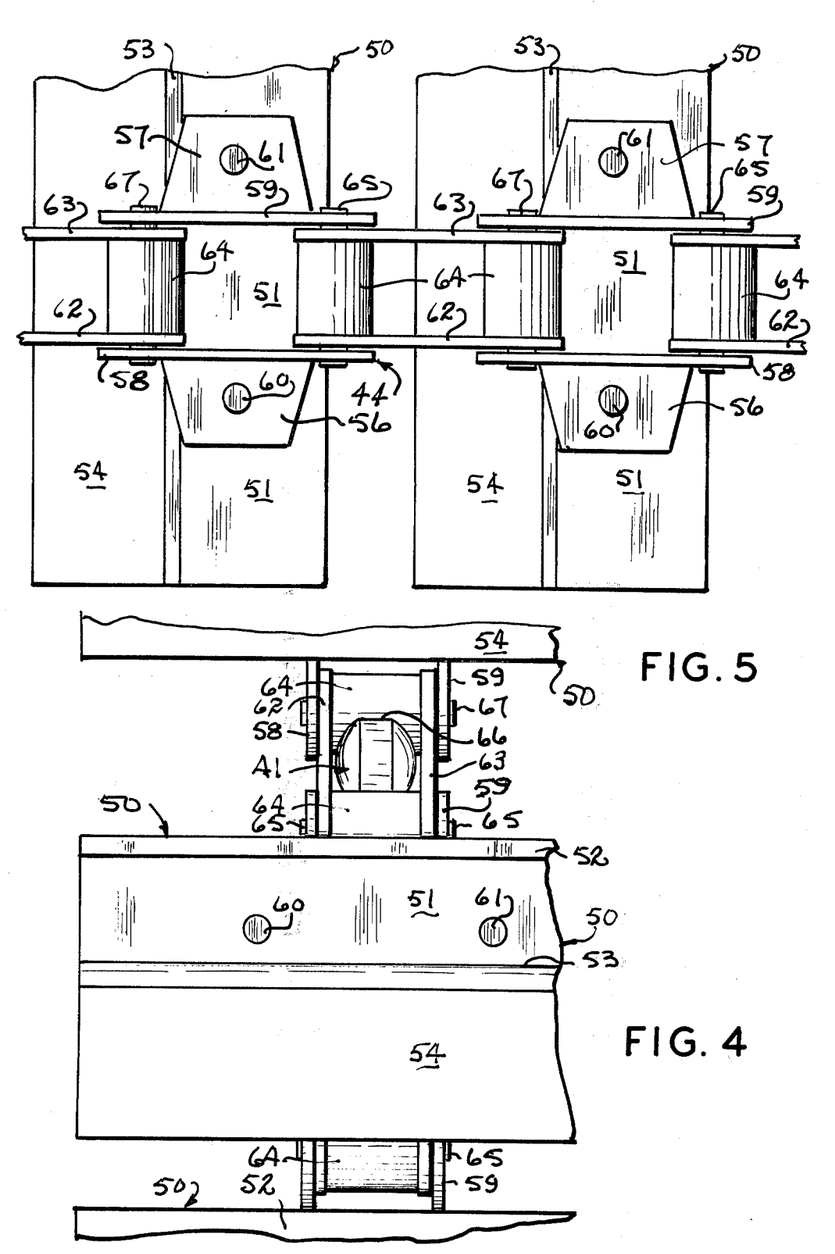
FIG. 4 is a partial end view of the rear sprocket drive wheel portion of FIG. 3 along a line 4—4 thereof.
FIG. 5 is an enlarged view of a portion of the conveyor of FIG. 2 taken along a line 5—5 thereof for showing further details of the slats and conveyor sprocket chain embodying the invention.
Figures 6, 7, 8:
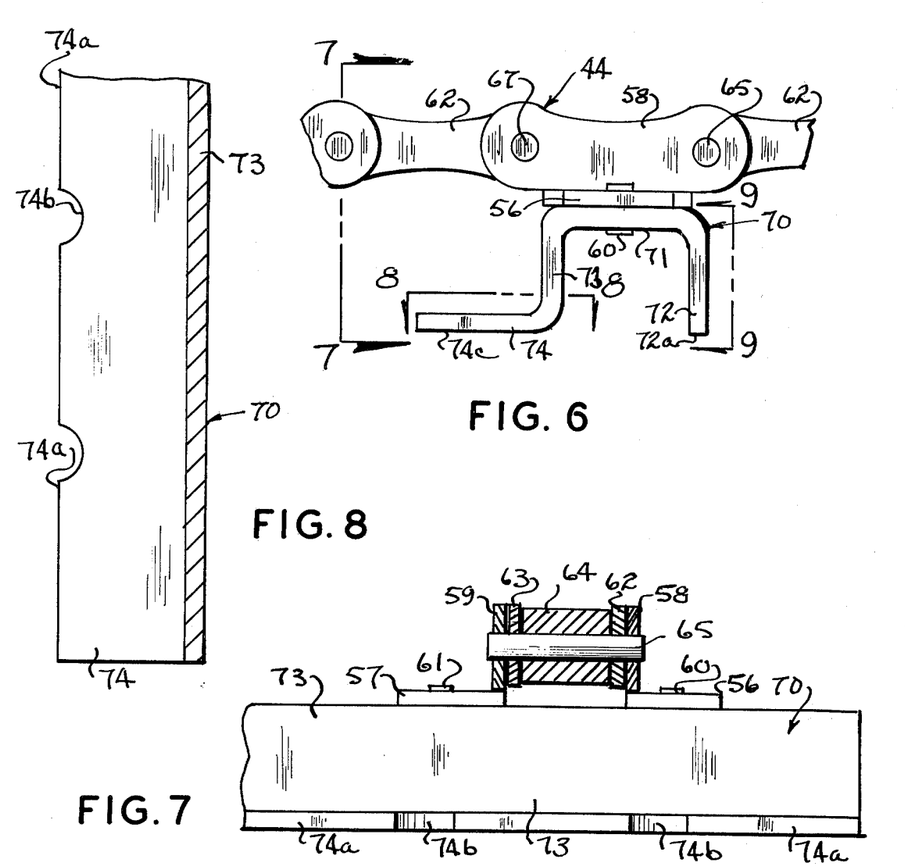
FIG. 6 is a side elevational view of a conveyor chain segment having a segment of a slat attached thereto embodying a modification of the invention.
FIG. 7 is a cross-sectional view of the conveyor chain taken along section line 7—7 of FIG. 6 and showing a trailing rear edge portion of the slat thereof.
FIG. 8 is a cross-sectional view of the slat taken along section line 8—8 of FIG. 6.
Figure 9:
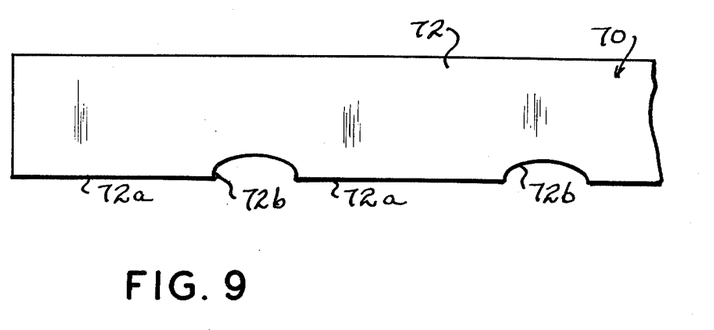
FIG. 9 is an elevational front end view of the slat taken along line 9—9 of FIG. 6.

The body portion leg 51 of the slat means 50 is connected adjacent one end thereof to oppositely extending coplanar flanges 56 and 57 of oppositely disposed sprocket chain link segments 58 and 59, respectively, by means of rivets 60 and 61, FIGS. 3, 4, and 5. The link segments 58 and 59 are pivotally connected at a front end thereof to a pair of link segments 62 and 63 sandwiched therebetween, and spaced apart by a cylindrical roller 64, and connected together in assembly by a headed pin or rivet 65. At a trailing end of the segments 58 and 59, another pair of similar link segments 62 and 63 are sandwiched therebetween, spaced apart by another cylindrical roller 64, and connected together in assembly by another headed pivot pin or rivet 65. Thus each link makes up the entire sprocket chain means 44.

The sprocket drive wheel means 41 has seven sprocket engaging teeth 66 each adapted to extend into the spaces between the pairs of link segments 58, 59 and 62, 63 with the rollers 64 adapted to seat on the curvilinear roots of the sprocket teeth 66, as shown in FIG. 3. The slat means 50 is similarly connected at the end thereof, not shown, of the other parallel sprocket chain, also not shown, of the sprocket chain means 44 in the manner described hereinabove to complete the assembly.

It will be understood that the slat means 50 is preferably used in conjunction with sprocket drive wheel means 41 having a relatively small diameter and as few teeth as possible to magnify and enhance the kicking, ejecting, scooping, pitching, and/or expelling action of the leg of flange 54 against the grain at the exit end of the conveyor means 30, FIG. 3. The angular velocity of the flange or leg 54 is angularly levered around the sprocket drive wheel means 41 and out of the rectilinear flow path of the grain as defined by the bottom pan 32. As seen in FIG. 3, the upwardly and rearwardly moving flange or leg 54 is levered downwardly towards the bottom pan 32 to compress the grain thereon and then is levered abruptly up and away from the bottom pan 32 in the direction of and/or against the threshing cylinder 33 at an accelerated or greater velocity or speed than the relatively uniform but lesser velocity of the sprocket chain means 44 due to the lowering action on the outermost grain engaging edge portion of the flange or leg 54 of the slat means 50.

Referring to the entrance end of the conveyor means 30, the flange or leg 54 of the slat means 50 as it rounds the sprocket idler wheel means 42 literally pounces onto and compresses the fresh cut unthreshed grain from the auger 29 and sweeps or drags the grain upwardly along the feeder house bottom pan 32.

A modification of the slat means of this invention is shown in FIGS. 6, 7, 8, and 9. The reference numeral 70 indicates generally slat means having legs 71, 72, 73, and 74 that are integrally connected together. The first and second legs 72 and 73 are parallel and extend perpendicularly downwardly from an horizontal web-like flange or body portion formed by the intermediate leg 71. A rearwardly extending flange is formed by the leg 74 disposed perpendicular to the leg 73 at a lower edge portion thereof. The leg 74 is generally horizontal in contrast to the flange leg 54 of the slat means 50 that is bent downwardly at a small angle of preferably eight degrees with the horizontal. The leg 71 is fixed to opposed flanges 56 and 57 of the sprocket chain means 44 as described in FIGS. 2, 3, 4, and 5, by headed pins or rivets 60 and 61.

The legs 72 and 74 at the lower portions thereof engage the fresh cut unthreshed grain in the feeder house 31 as described relative to the slat means 50. However, in order to provide greater frictional engagement with the grain and effective stripping action in the feeder house 31, a trailing edge portion 74a of the leg 74 and a lower edge portion 72a of the leg 72 are formed with arcuate recesses 74b and curved, oval, or semi-elliptical recesses 72b, respectively. The relatively broad flat undersurface 74c of the leg 74 and the relatively broad flat lower edge portion 72a of the leg 72 assure that the grain will not be sheared, severed, or cut unduely during the conveying action of the slat means 70 thereagainst for more effective and efficient conveying action.

Figures 10, 11, 12:
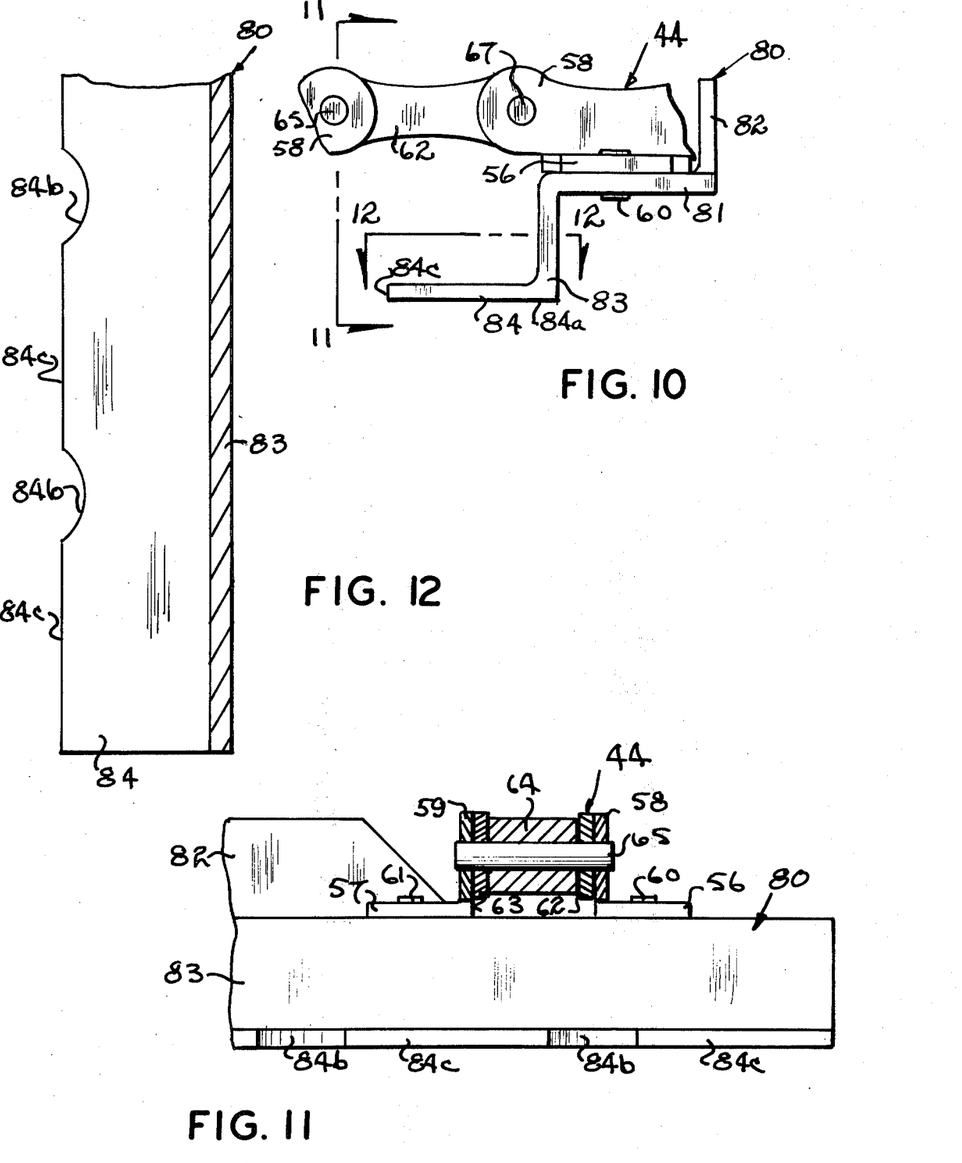
FIG. 10 is a side elevational view similar to FIG. 6 of a conveyor chain segment having a segment of a slat attached thereto embodying another modification of the invention.
FIG. 11 is a cross-sectional view of the conveyor chain taken along section line 11—11 of FIG. 10.
FIG. 12 is a cross-sectional view of the slat of FIG. 10 taken along a section line 12—12 thereof.

Referring to FIGS. 10, 11, and 12, reference numeral 80 indicates generally modified slat means embodying the invention. The slat means 80 has a stair-stepped cross-sectional configuration comprising flat rectangular legs 81, 82, 83, and 84 with the leg 81 being fixed to the opposed flanges 56 and 57 by headed pins or rivets 60 and 61, respectively. The legs 81 and 84 are parallel and horizontal and are respectively connected to a lower edge portion of legs 82 and 83. The legs 82 and 83 are parallel and vertical. The leg 84 forms a rearwardly extending flange that operates as a grain kicker, ejector, scooper, pitcher, and/or expeller when rounding the sprocket drive wheel means 41 as described in connection with the slat means 50.

The leg 82 functions as a deflector panel for the grain between the laterally disposed conveyor sprocket chain means 44 of this invention. The legs 81, 83, and 84 are transversely coextensive while the leg 82 terminates between the sprocket chain means 44 at an angle of approximately 45°, FIG. 11.

A flat underside 84a of the flange leg 84 engages the grain with a broad flat rectangular surface area. However, stripping action of the slat means 80 is assured by the provision of arcuate serrations, notches, or recesses 84b formed in a trailing edge portion 84c of the flange leg 84.

Figure 13:
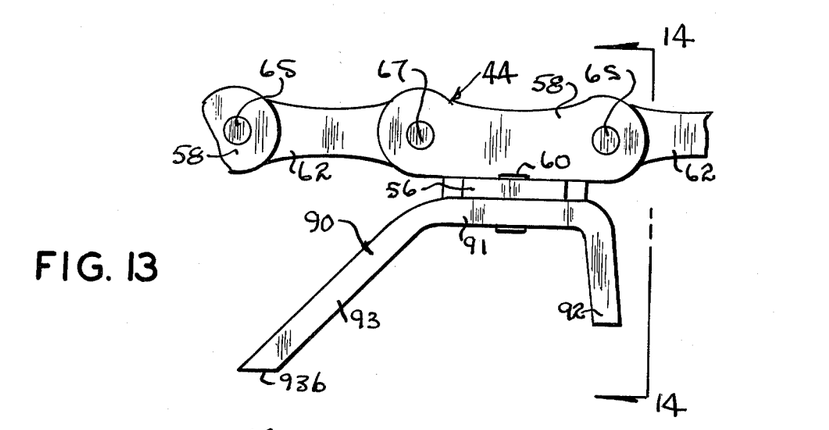
FIG. 13 is a view similar to FIGS. 6 and 10 of a conveyor chain segment having a segment of a slat attached thereto and embodying a further modification of the invention.
Figure 14:
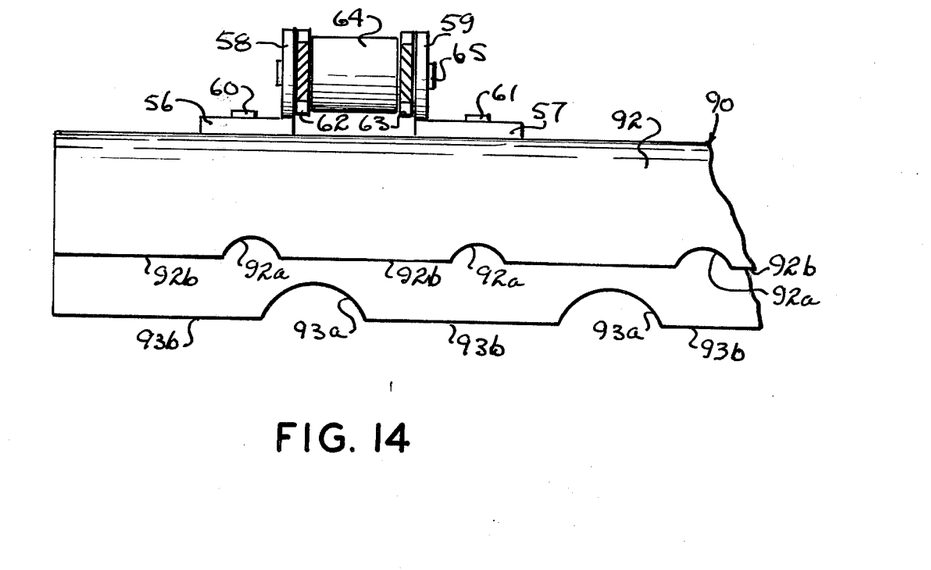
FIG. 14 is a front elevational view of the slat segment of FIG. 13 taken along a line 14—14 thereof.

Referring to FIGS. 13 and 14, reference numeral 90 indicates generally a further modified slat means embodying this invention. The slat means 90 comprises legs 91, 92, and 93 each of generally rectangular configuration integrally connected together. The leg 91 is fixed to chain link flanges 56 and 57 by headed rivets or pins 60 and 61, respectively. A front downwardly extending flange is formed by the legs 92 and a rearwardly extending flange is formed by the legs 93. The leg 93 is disposed at an angle of approximately 45° with a plane defined by a path of travel of the slat means 90. The leg 91 and the leg 92 define an included angle of approximately 98° therebetween.

Adequate stripping action of the slat means 90 is assured by arcuate notches, recesses, and/or serrations 93a and 92a respectively formed in lower edge portions 93b and 92b thereof, respectively. The slat means 90 has an inverted cross-sectional configuration formed by the legs 91, 92, and 93.

Figure 15:
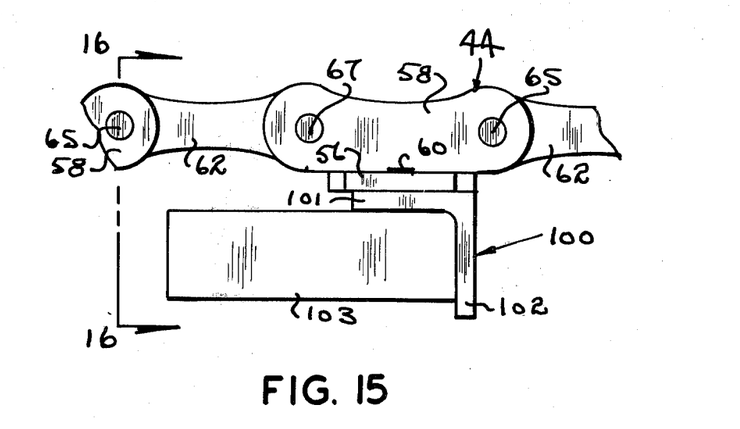
FIG. 15 is a view similar to FIGS. 6, 10, and 13 of a conveyor chain segment having a segment of a slat attached thereto embodying another modification of the invention.
Figure 16:
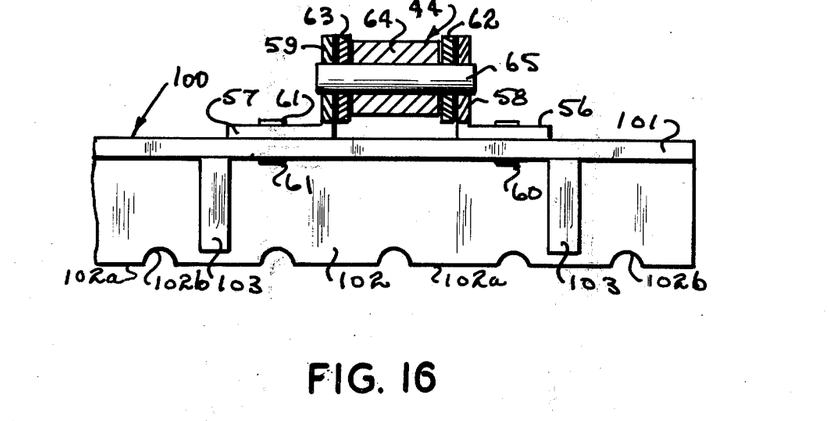
FIG. 16 is a cross-sectional view taken along section line 16—16 of FIG. 15.

Referring to FIGS. 15 and 16, reference numeral 100 indicates generally slat means embodying a modification of this invention. The slat means 100 comprises legs 101 and 102 integrally connected together at right angles to each other. The leg 101 is horizontal and is fixed to the opposed chain link flanges 56 and 57 by the headed pins or rivets 60 and 61, respectively, in a manner previously described herein. In order to provide good stripping action, a lower edge portion 102a is formed with arcuate notches, recesses, and/or serrations 102b formed therein.

The ejecting, stripping, scooping, pitching, kicking, and/or expelling action of the slat means 100 is provided by horizontal rearwardly extending fingers 103 integrally connected to the legs 101 and 102 of the slat means 100 at the inner junction portion thereof. The fingers 103 are each of a rectangular cross-section and are each of rectangular solid configuration, FIGS. 15 and 16. The fingers 103 are spaced along and slightly above the lower edge portion 102a of the grain engaging leg 102 and extends rearwardly of the chain link pin 67 almost to the next chain link pin 65, for maximum kicking action.

Figure 17:
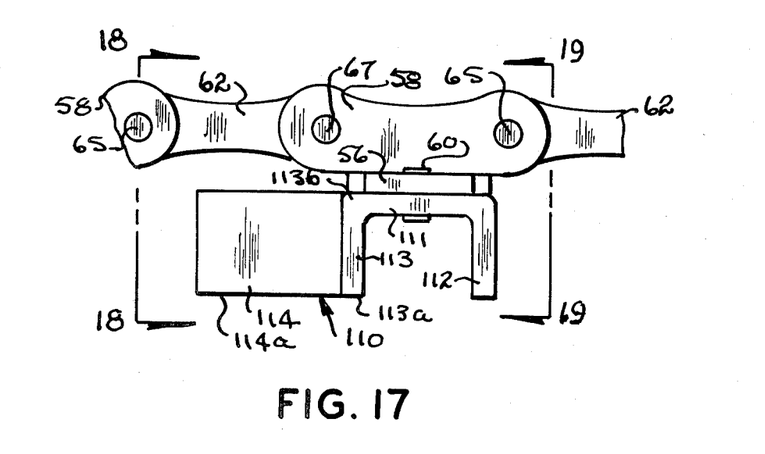
FIG. 17 is a view similar to FIGS. 6, 10, 13, and 15 of a conveyor chain segment having a segment of a slat attached thereto embodying another modification of the invention.
Figure 18:
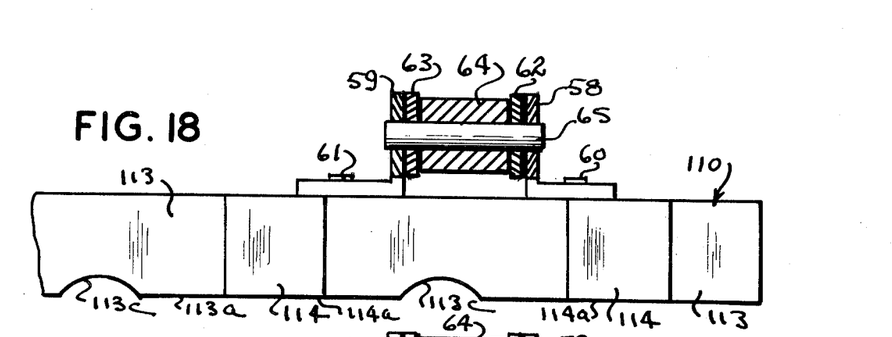
FIG. 18 is a cross-sectional view of the conveyor chain segment taken along section line 18—18 of FIG. 17.
Figure 19:
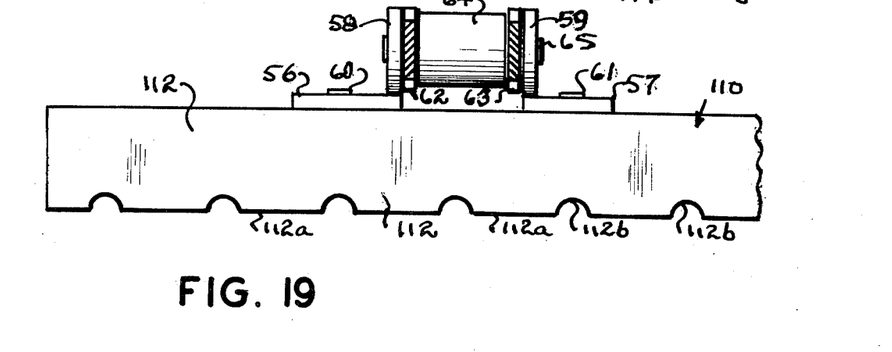
FIG. 19 is a cross-sectional view of the conveyor chain segment taken along section line 19—19 of FIG. 17.

Referring to FIGS. 17, 18, and 19, reference numeral 110 indicates generally a modified slat means embodying the invention. The slat means 110 comprises legs 111, 112, and 113 of rectangular configuration. The legs 112 and 113 are vertically downwardly extending and parallel to each other. The legs 112 and 113 at the upper edge portions thereof are integrally connected to the leg 111, which is horizontal and perpendicular to the legs 112 and 113. The leg 111 is fixed to the opposing flanges 56 and 57 by headed pins or rivets 60 and 61, respectively, in the same manner described hereinabove in connection therewith. The legs 111, 112, and 113 form an inverted U-shaped cross-sectional configuration. Laterally spaced horizontal fingers 114 having a square or rectangular cross-sectional configuration are integrally connected at the forward or leading ends thereof to the leg 113 coplanar with lower edge portions 113b and 114b. The lower edge portion 113a is preferably formed with arcuate notches, recesses, and/or serrations 113c. Likewise, a lower edge portion 112a of the leg 112 is formed with arcuate notches, recesses, and/or serrations 112b to provide the desired stripping action. The fingers 114 provide the aforedescribed kicking, ejecting, scooping, pitching, stripping, and/or expelling action of this invention.

Figure 20:
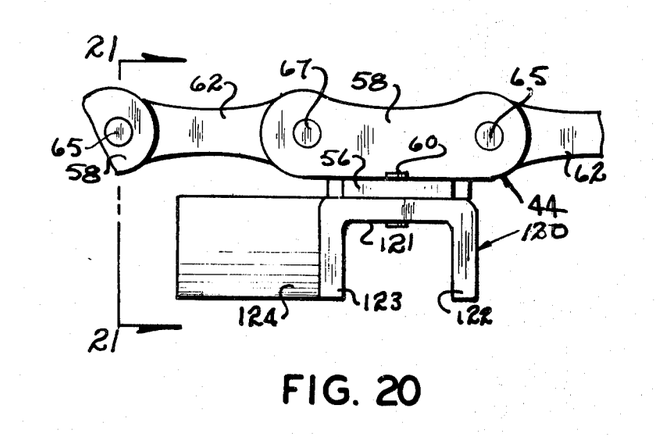
FIG. 20 is a view similar to FIGS. 6, 10, 13, 15, and 17 of a conveyor chain segment having a segment of a slat attached thereto embodying yet another modification of the invention.
Figure 21:
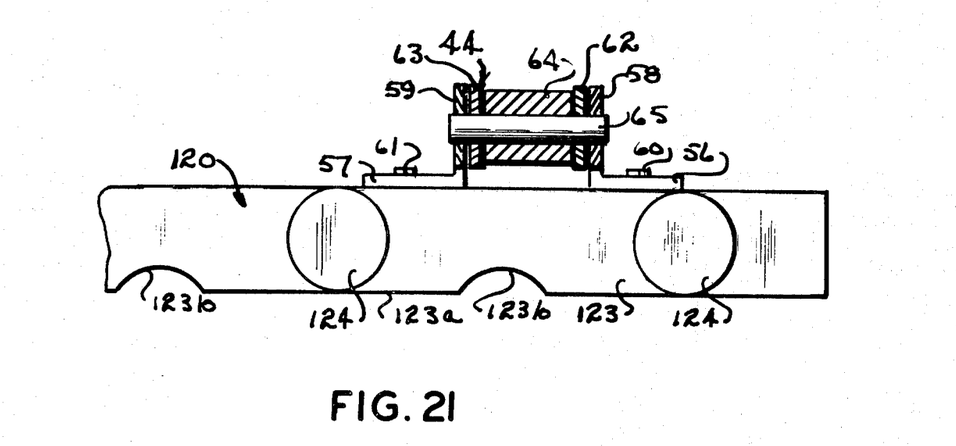
FIG. 21 is a cross-sectional view of the conveyor chain segment taken along section line 21—21 of FIG. 20.

Referring to FIGS. 20 and 21, reference numeral 120 indicates generally a modification of the slat means embodying this invention. The slat means 120 comprises integrally connected legs 121, 122, and 123 that form an inverted U-shaped cross-sectional configuration that may also be referred to as channel-shaped, similar to the legs 111, 112, and 113 of the slat means 110 of the prior art embodiment. The chief difference resides in the provision of laterally spaced, rearwardly extending fingers 124 of cylindrical configuration and of circular cross-sectional configuration. The diameter of the fingers 124 is the same as the height of the leg 123. A lower edge portion 123a of the leg 123 is formed with arcuate notches, recesses, and/or serrations 123b to provide the desired stripping action of the slat means 120 in the feeder house 31 of the combine 26. The fingers 124 provide the aforedescribed kicking, scooping, pitching, ejecting, stripping, and/or expelling action of the slat means 120.

It will be understood that there need not be slat means embodying this invention used exclusively on the sprocket chain means 44, but that slats of prior art configurations can be interspersed with the slat means of this invention. Likewise, not every chain link need have a slat attached thereto, but every other one, every third, or any other chain link can be skipped or provided with slat means as desired.

It will also be understood that the recesses, notches, and/or serrations described herein with connection to the various embodiments of this invention may be spaced along the edge portions of the legs by adding one inch to the length of the recess along the edge portion before the placement of the next recess as desired.

More particularly, a preferred formula used herein for the spacing of the stripping action recesses in the grain engaging edge portions of the various legs described in the foregoing specification resolves itself to $x+1$ length along the leg edge portion where $x$ is the rectilinear length of the recess and $x+1$ inch is the distance between the adjacent recesses. Therefore, the distance between the centers of the recesses would by $2x+1$ inch, where $x$ is in inches also.

Figure 22:
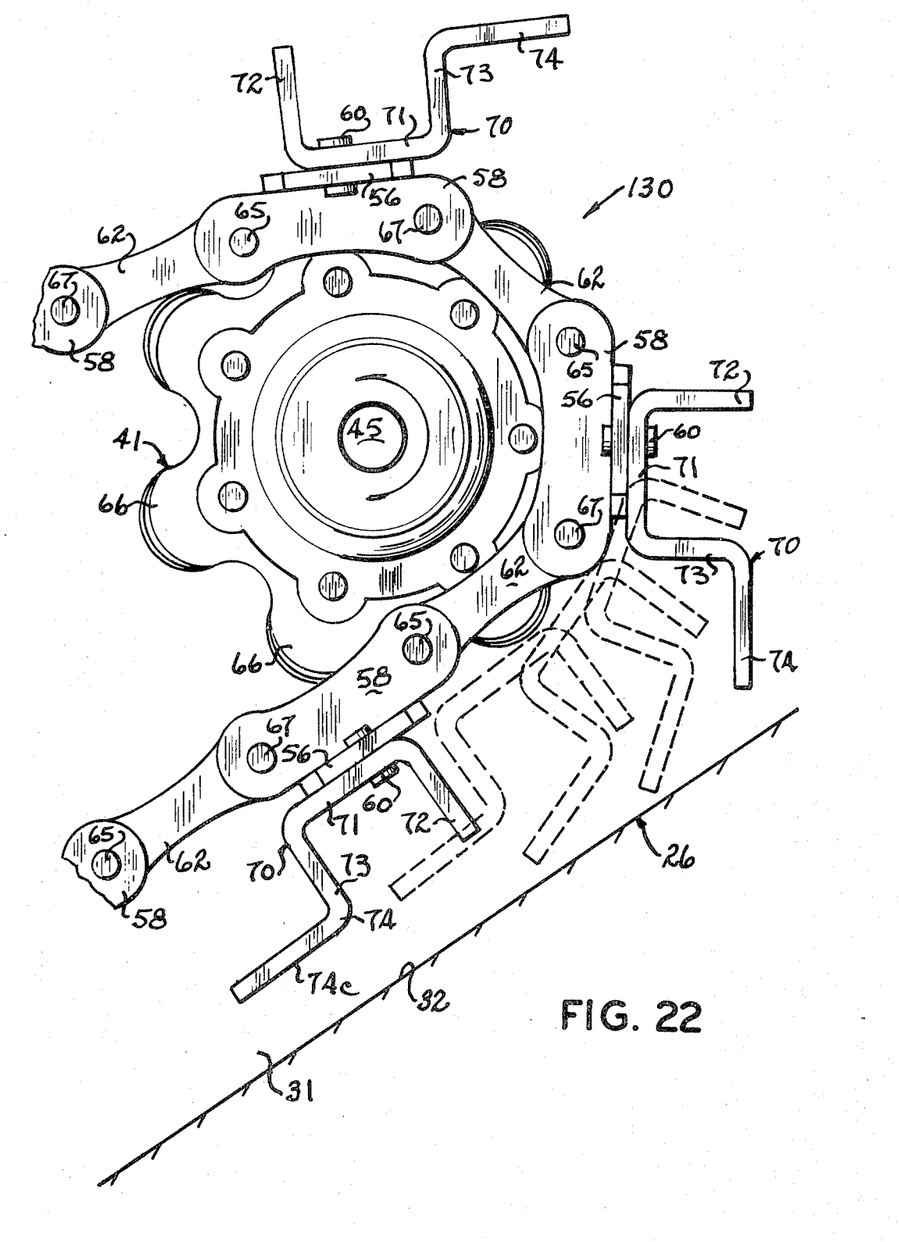
FIG. 22 is a view similar to FIG. 3 showing the slat of FIGS. 6, 7, 8, and 9 positioned on the sprocket chain in such a manner as to increase the ejection, stripping, expelling, scooping, pitching, and/or kicker action of the slats of this invention.

Referring to FIG. 22, reference numeral 130 indicates generally an assembly of the slat means 70 of FIGS. 6, 7, 8, and 9, with the rear drive wheel means 41 on the shaft 45 and the sprocket chain means 44 of FIG. 3 of the combine 26 in a manner to be described. The slat means 70 are connected to the oppositely extending coplanar flanges 56 and 57 of the oppositely disposed sprocket chain link segments 58 and 59, FIG. 22, by means of the rivets 60 and 61, the same as in FIGS. 6 and 7. However, in this embodiment of the invention, the web or leg 71 of the slat means 70 is moved rearwardly as much as possible so that the rivets 60 and 61 are adjacent to or near juxtaposition with the leg 72 of the slat means 70, FIG. 22. The advantage of this novel arrangement is to permit the leg 74 of the slat means 70 to swing in a wider arc or longer path to provide a greater stripping, scooping, pitching, ejecting and/or impelling action to the fresh cut unthreshed grain from the auger 29 and onto the threshing cylinder 33.

It will be understood that the present invention may be modified to adapt it to various circumstances and conditions, and it is accordingly desired to comprehend within the purview of this invention such modifications as may be considered to fall within the scope of the appended claims.

What is claimed, is:

1. In a combine for harvesting grain, a conveyor means mounted in a feeder housing comprising:
   a. sprocket drive wheel means and sprocket driven wheel means rotatably connected to said feeder housing;
   b. said feeder housing having an upwardly inclined bottom pan to receive grain thereon;
   c. a sprocket chain means disposed over and driven by said sprocket drive wheel means and disposed over and carried by said sprocket driven wheel means;
   d. said sprocket chain means having an inclined substantial portion parallel to and adjacent said bottom wall of said feeder housing;
   e. a plurality of transverse slat means connected to and carried by said sprocket chain means at oppositely disposed links thereof;

f. each of said transverse slat means having first and second parallel legs interconnected by an intermediate leg being of generally U-shape in transverse cross section and a rearwardly extending flange integral with said second leg;

g. said rearwardly extended flange and said intermediate leg parallel to each other and said bottom pan; and h. outer surfaces of said first leg and said rearwardly extending flange cooperate to compress grain against said bottom pan while moving upwardly by said sprocket chain means;

whereby on initiating movement about said sprocket drive wheel means, said outer surface of said rearwardly extending flange first further compresses the grain and then forcefully ejects the fresh cut unthreshed grain therefrom at an increased velocity.

2. A conveyor means as described in claim 1, wherein:

a. said sprocket chain means having a plurality of pivotally interconnected link segments;

b. said link segments each having forward and rearward pivot points; and c. each of said transverse slat means connected to respective ones of said link segments rearwardly of said forward pivot point.

3. A conveyor means as described in claim 1, wherein:

a. said outer surface of said rearwardly extending flange is substantially flat and moves parallel to said bottom pan to hold the grain thereagainst without a shearing or severing action against the grain; and b. said outer surface of said first leg to first contact fresh grain on initially moving into said conveyor means and clamp the grain against said bottom pan with said rearwardly extending flange next contacting the grain on moving into parallel position with said bottom pan to compress the grain thereagainst.

4. A conveyor means as described in claim 1, wherein:

a. said rearwardly extending flange having a trailing edge with a plurality of spaced recesses therein to aid in the stripping action of said slot means.

5. A conveyor means as described in claim 1, wherein:

a. said first leg having a lower edge with a plurality of recesses therein to aid in the stripping action of said slat means.

6. A conveyor means as described in claim 2, wherein:

a. said rearwardly extending flange extended rearwardly of said rearward pivot point of said link segments to enable said rearwardly extending flange to increase in speed and accelerated when rounding said sprocket driven means to eject the fresh cut unthreshed grain therefrom at increased velocity relative to movement up said bottom pan.

7. A conveyor means as described in claim 1, wherein:

a. said rearwardly extending flange inclined downwardly and rearwardly of its connection to said second leg to position a trailing edge closer to said bottom pan than its forward edge to achieve greater compression of fresh uncut grain.

* * * * *